United States Patent
Arosio

(10) Patent No.: US 6,439,558 B1
(45) Date of Patent: Aug. 27, 2002

(54) PALLET FOR CLAMPING A WORKPIECE TO BE PROCESSED

(75) Inventor: Massimo Arosio, Rivolta d'Adda (IT)

(73) Assignee: OMBA S.r.l., Melzo (IT)

( * ) Notice: Subject to any disclaimer, the term of this patent is extended or adjusted under 35 U.S.C. 154(b) by 0 days.

(21) Appl. No.: 09/705,191

(22) Filed: Nov. 2, 2000

(51) Int. Cl.[7] ............................................. B23Q 3/10
(52) U.S. Cl. ............................................ 269/20; 269/309
(58) Field of Search ..................... 198/345.3; 269/309, 269/310, 25, 32, 20, 233, 236

(56) References Cited

U.S. PATENT DOCUMENTS

| | | | | |
|---|---|---|---|---|
| 4,520,919 A | * | 6/1985 | Keitaro | ........................ 269/25 |
| 4,738,439 A | * | 4/1988 | Satake | ........................ 269/309 |
| 4,759,536 A | * | 7/1988 | Takeuchi et al. | ............ 269/309 |
| 5,190,272 A | * | 3/1993 | Zika et al. | ................... 269/309 |

* cited by examiner

Primary Examiner—Robert C. Watson
(74) Attorney, Agent, or Firm—Kirschstein, et al.

(57) ABSTRACT

A pallet for clamping a workpiece to be processed, in particular by machining operations, wherein the pallet is connected to a holding fixture which accommodates a quick-acting connection which is provided with conduits for the feed of a hydraulic fluid to a piston/cylinder unit and with a quick-acting connection in combination with conduits for the return of the hydraulic fluid, in which case these first connections can be connected to second quick-acting connections which are connected to a conduit for the feed of the hydraulic fluid and to a conduit for the return of the hydraulic fluid to a hydraulic supply unit, and the second quick-acting connections are arranged in a holding body which has an actuating lever for a connecting device, and the actuating lever has an eccentric slot, which can be connected to a guide pin which is fastened to the holding body for the first quick-acting connections.

8 Claims, 4 Drawing Sheets

PALLET FOR CLAMPING A WORKPIECE TO BE PROCESSED

The above invention relates to a pallet for clamping a workpiece which is subjected to processing operations, e.g. machining operations.

It is generally known that, for machining in modern machining centers, the workpieces are arranged on a pallet and clamped in an accurate position on the pallet, one or more piston/cylinder units being used for the clamping operation. The piston/cylinder units used are actuated with the use of a pressurized fluid, e.g. hydraulic oil, and the forces applied are transmitted to clamping jaws which act on the workpiece to be processed and clamp the latter in position on the pallet.

After the operation for clamping the workpiece on the pallet has been carried out, the pallet is moved together with the workpiece along precision guides, which are arranged in parallel and are, for example, an integral part of a machining center in which milling attachments, drilling attachments and grinding attachments act on the workpiece.

In order to be able to actuate the piston/cylinder units which are arranged on the known pallet, each pallet has connections for the feed and the discharge of a hydraulic fluid. The fluid is delivered in flexible conduits in operative connection with a supply unit.

In the known devices of this type, the connection pieces arranged on the flexible tubes are provided with a thread in order to enable these connection pieces to be connected to conduits which are arranged on the pallet. The conduits on the pallet extend up to the piston/cylinder units of the pallet and serve to clamp the workpiece.

In order to be able to interrupt the flow of the hydraulic fluid which is fed to the conduits of the pallet, it is necessary to provide a specific ball valve for each inflow line and for each return line of the hydraulic fluid.

Therefore, in order to move a pallet together with a workpiece along the precision guide of a machine tool, it was necessary in the past to carry out the following steps:

The pallet had to be arranged together with the workpiece in a waiting position in order to close or open the clamping jaws which acted on the workpiece; a first connection piece had to be fitted in order to permit the feed of a pressurized hydraulic fluid to the piston/cylinder units; it was then necessary to check whether this connection piece was also properly connected to those conduits which led to the clamping devices; furthermore, a second connection piece with the associated conduits had to be fitted in order to permit a return of the hydraulic fluid from the pallet; after the fitting and the requisite checks had been carried out, it was necessary to open a ball valve in the feed lines and to actuate the pump of the supply unit; after the operation for clamping this workpiece had been carried out, a ball valve provided in the inflow line had to be closed and the delivery pump of the hydraulic supply unit had to be switched off; conduits which were provided for the inflow and the outflow of the hydraulic fluid then had to be connected, and it was then possible to feed the workpiece to the individual machining operations.

At the end of the machining operations on the workpiece, flexible conduits had to be connected again via connecting pieces in an unloading station for the workpiece, and a ball valve had to be operated in order to permit the return of the hydraulic fluid to the supply unit and in order to enable the machined workpiece to be unlocked.

The clamping and unlocking devices for pallets of the type described, as have been disclosed by the prior art, had various disadvantages.

Thus, first of all, it was necessary to pay great attention during the fitting of the feed tube and the discharge tube for the hydraulic fluid; the connection pieces for the feed and the return of the hydraulic fluid had to be subjected to a thorough inspection in order to avoid a pressure loss or an escape of hydraulic fluid from the piston/cylinder units of the clamping device during the feed movement of the pallet through the machining unit.

After the actuation of the clamping device, it was necessary to operate ball valves and the supply unit in order to open the clamping device.

During these actuating operations there was always the risk of incorrect manipulation, which could have very serious consequences, e.g. release of the workpiece during the transport movement of the pallet and during the machining of the workpiece.

The object of the above invention is to avoid the disadvantages of the prior art and to propose a novel pallet of the type mentioned at the beginning, in which the provision of ball valves in the conduits may be dispensed with, and to enable the hydraulic devices of the pallet to be fitted together with the conduits of the hydraulic supply unit without any risk of error, and furthermore to permit connection or release of the hose lines between pallet and supply unit with the greatest possible speed and safety.

These objects are achieved with a pallet for clamping a workpiece to be processed which is connected to a holding fixture which accommodates a quick-acting connection which is provided with conduits for the feed of a hydraulic fluid to a piston/cylinder unit of the pallet and with a quick-acting connection in combination with the return of the hydraulic fluid from the piston/cylinder units, in which case these first quick-acting connections can be connected to second quick-acting connections which are connected to a conduit for the feed of the hydraulic fluid and to a conduit for the return of the hydraulic fluid to a supply unit, the second connection pieces are arranged in a holding fixture which has an actuating lever for a connecting device, and the actuating lever is arranged on a disk which has an eccentric slot, and the eccentric slot can be connected to a guide pin which is fastened to the holding fixture for the first quick-acting connections.

The subject-matter of the invention is described in more detail with reference to an exemplary embodiment and is shown in the attached drawings.

Figure 1:
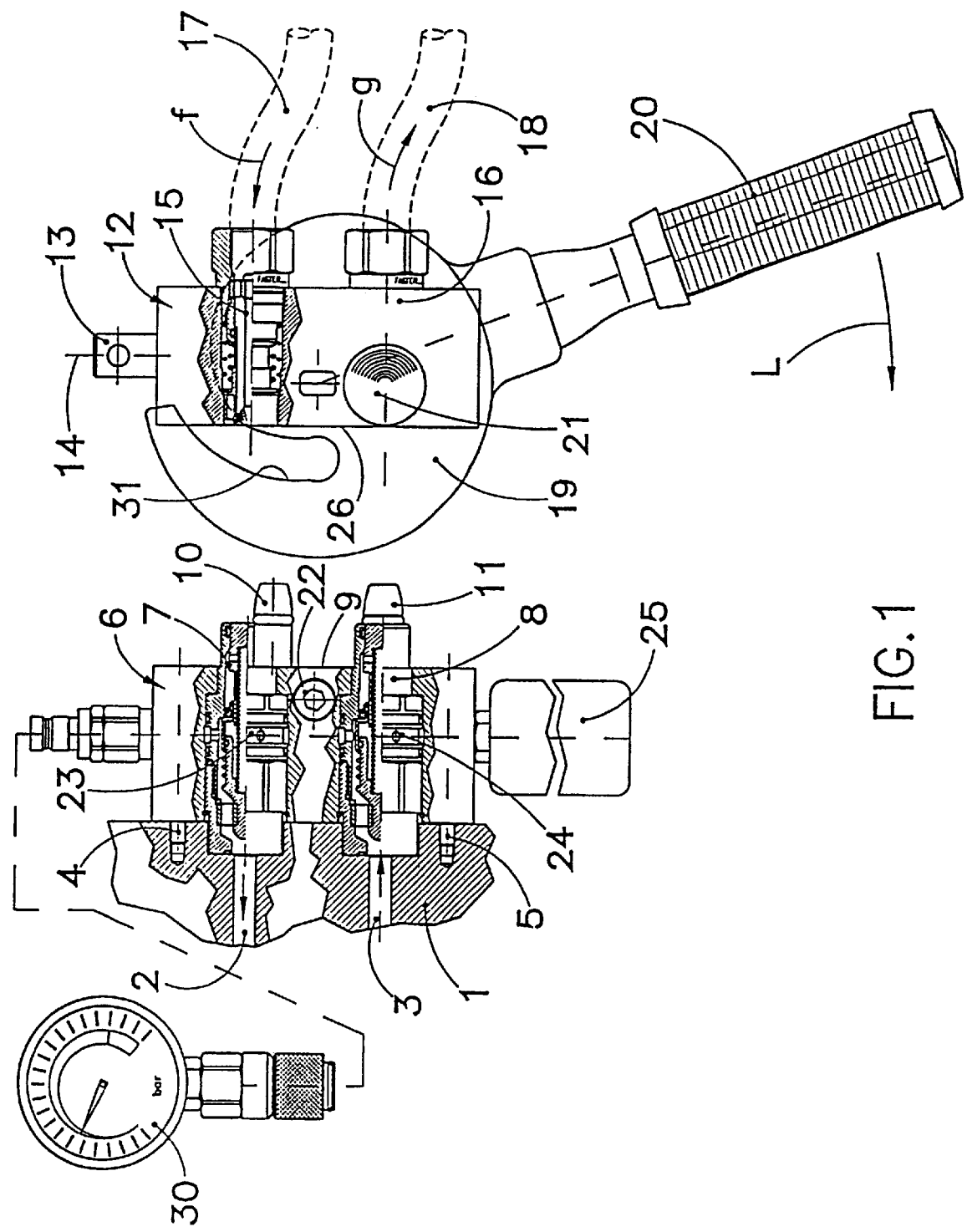
FIG. 1 shows the pallet and the holding fixture for the quick-acting connections, partly in section and partly in exploded view.
Figure 2:
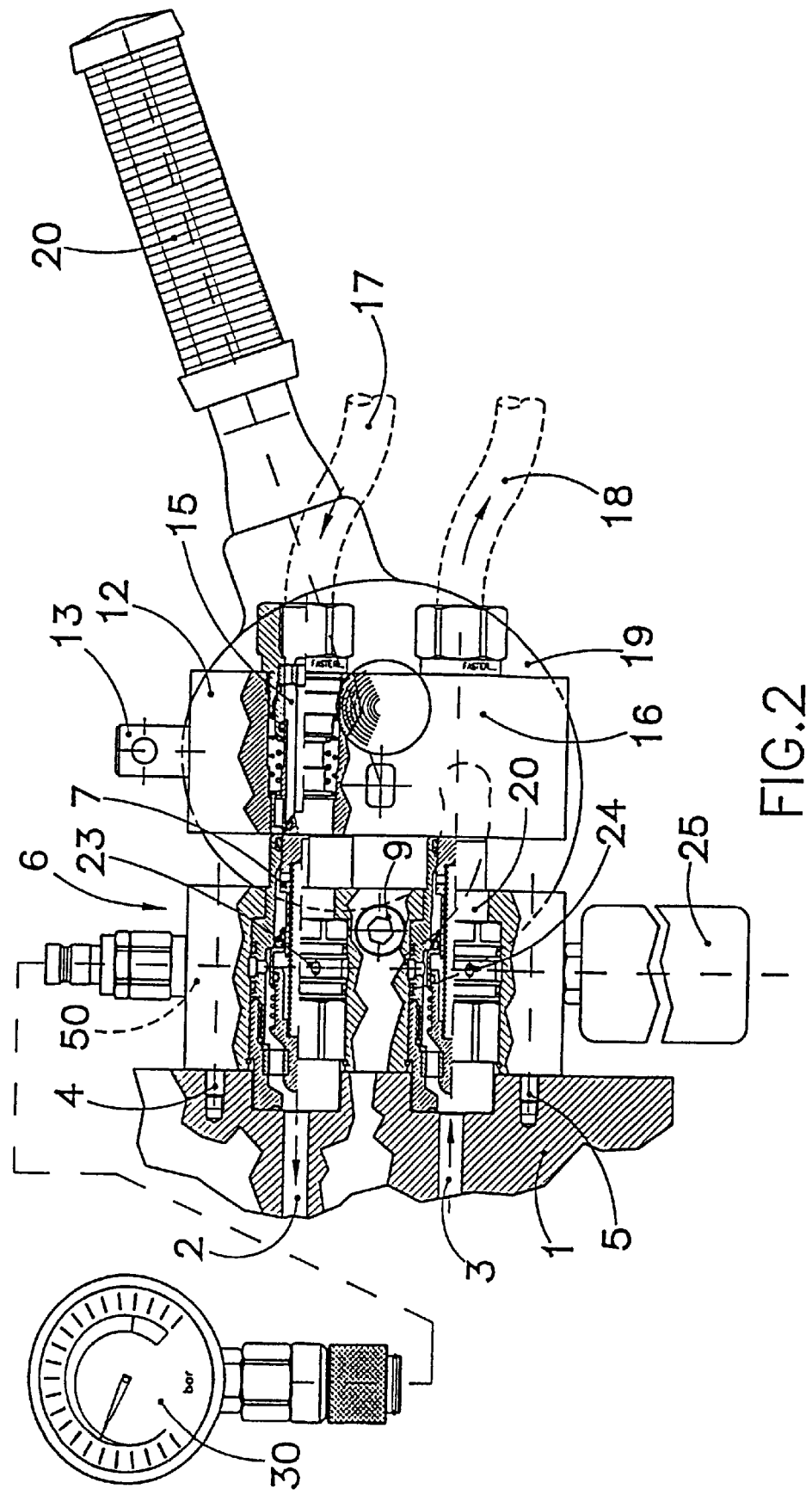
FIG. 2 shows a part of the pallet and the quick-acting connections during the connecting operation.
Figure 3:
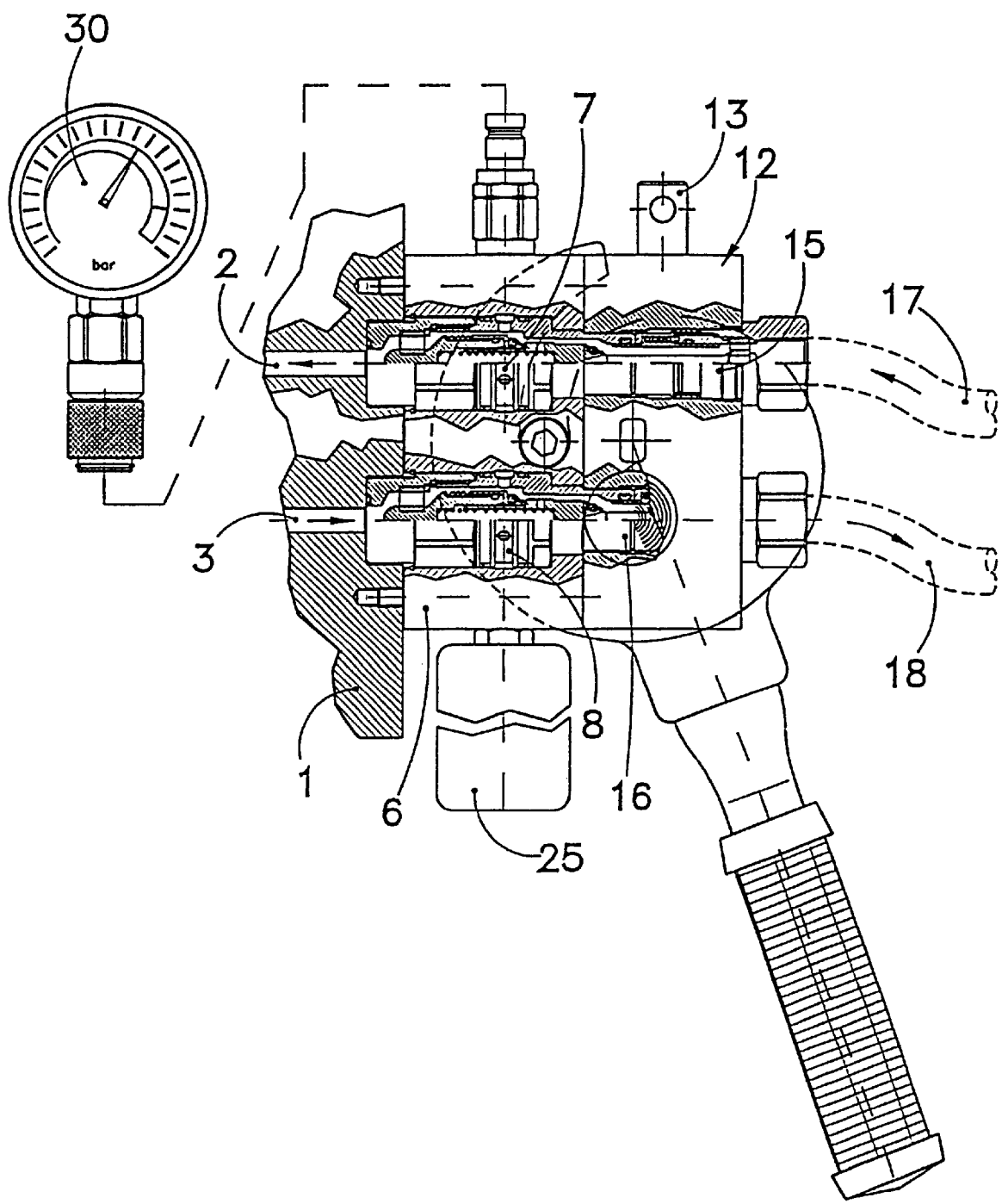
FIG. 3 shows a part of the pallet with the quick-acting connections after they have been fitted together.

As can be seen from FIG. 1, the pallet 1 serves to accommodate a workpiece to be processed (not shown).

The pallet 1 has a conduit 2 for the feed of a hydraulic fluid to piston/cylinder units.

Such piston/cylinder units are known from the prior art and serve to act on likewise known clamping devices, which are not shown in FIG. 1.

Furthermore, the pallet 1 has a conduit for the return of the hydraulic fluid from the piston/cylinder units.

With the use of screws, which are identified schematically by 4 and 5, a holding fixture, which is identified overall by 6, is connected to the pallet 1.

In accordance with the conduits 2, the holding fixture 6 has a quick-locking mechanism 7, and is also equipped with a quick-locking mechanism 8 in accordance with the conduit 3.

In FIG. 1, the quick-locking mechanisms 7 and 8 of the holding fixture 6 are designed as projecting devices, i.e. the free ends of the quick-locking mechanisms 7 and 8 project from a flat surface 9 of the holding fixture 6.

Furthermore, pins 10 and 11, which serve as devices for locating and connecting a further holding fixture 12, project from the flat surface 9.

The holding fixture 12 has bores (not shown) for an accurate positional arrangement. The connecting pins 10 and 11 are inserted into the bores during the assembly operation.

The holding fixture 12 has a bracket 13 or a similar component which enables the holding fixture 12 to be connected to a holding rope 14 and enables the holding fixture 12 to be mounted in a suspended manner in a precisely determined vertical position.

The holding fixture 12 has a quick-acting coupling 15 and a quick-acting coupling 16.

The coupling pieces 15 and 16 are provided with a connecting opening and can be fitted together with the quick-acting couplings 7 and 8 of the holding fixture 6.

Quick-acting couplings 7, 8, 15, 16, as described hitherto, are known from the prior art and are described, for example, in Italian Patent 1.296.815 of the applicant.

A conduit 17 for the supply of the hydraulic fluid, arrow (f), is connected to the quick-acting coupling 15.

The quick-locking mechanism 16 is also connected to a conduit 18, which is intended for the return of the hydraulic fluid, as indicated by the arrow (g).

Connected to the holding fixture 12 is a clamping device which consists of a disk-shaped component 19, which is connected to an actuating lever.

The disk 19 can be pivoted about a pin 21 and has a slot 31, which has an eccentric profile and can be connected to the pin 22 which projects laterally from the holding fixture 6.

By actuation of the lever 20 in the direction identified by (L) (FIG. 1), a connection is made between the eccentric slot 31 and the pin 22 and this makes it possible to connect the quick-locking mechanisms 7, 8 and 15, 16 by pressing the flat surface 9 against the flat surface 26.

Figure 4:
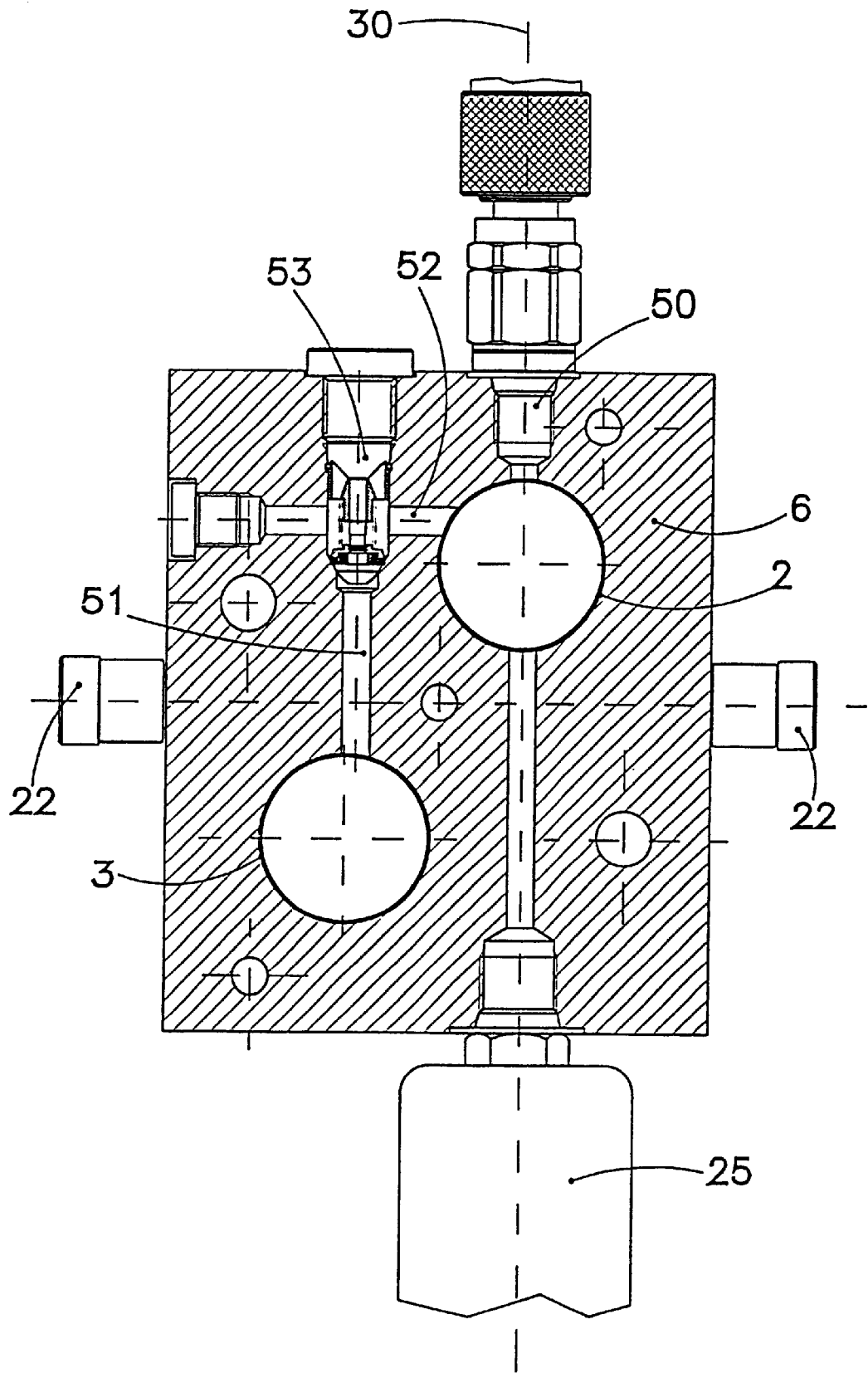
FIG. 4 shows a schematic section of a holding fixture with a feed line and a return line for the hydraulic fluid and with auxiliary devices.

On the inside, the quick-locking mechanism 8 of the holding fixture has a plurality of bores 24 which are in operative connection with a pressure reservoir 25 via an annular chamber and via lines (see FIG. 4).

The task of this pressure reservoir 25 is to reliably maintain the hydraulic pressure in the interior of the conduits 2 and 3 of the pallet 1, even if the quick-locking mechanisms 15, 16 have been released from the quick-locking mechanisms 7 and 8 after pressurizing of the conduits 2, 3.

Via a line 50, which is built into the holding fixture 6, the feed line 2 is connected to a pressure gage 30, which indicates the working pressure and also any pressure drops which may occur in the line system.

In an especially advantageous manner, connecting lines 51, 52, in which a check valve 53 is fitted, are provided between the return line 3 of the pallet 1, which extends to the quick-acting connection 8, and the feed line 2 for the hydraulic fluid, which extends to the quick-acting connection 7.

The check valve 53 enables the opening pressure to be partly lowered, which avoids a situation in which the piston/cylinder units retract too quickly on account of the high pressures prevailing.

The task of the check valve 53 is also to keep the oil in the feed line 2, 7 under pressure when the pallet and the clamped workpiece are subjected to the machining operations.

The pressure in the return line is also limited by the provision of a check valve 53 when the pallet 1 is to be unloaded.

During the operation for unloading the workpiece, the pressure in the feed lines 2, 7 is reduced and the pressure in the return lines 3, 8 increased with the aid of the supply unit, which leads to the piston/cylinder units retracting and releasing the workpiece.

With the pressure gage 30, it is continuously possible to read off and monitor the pressure in the interior of the conduit system of the pallet 1, even when the pallet is traversed along parallel precision guides of a machining center (not shown), e.g. in a modern machining center which is controlled via an NC device.

In order to clamp a workpiece to be machined on the pallet 1, the device according to the invention is used as follows:

As soon as the workpiece to be machined is arranged on the pallet 1 in the desired position, the holding fixture 12 with the quick-acting connections 15 and 16, which is connected to the supply unit (not shown) via conduits 17 and 18, is moved up to the holding fixture 6, which is connected to the pallet 1.

The positioning pins 10 and 11 which project from the holding fixture 6 are then inserted into the reference bores (not shown) of the holding fixture 12.

The eccentric opening 31 of the slot in the disk 19 is then brought into operative connection with the clamping pin 22, which projects from the fixture 6, and the holding fixture 12 is then brought closer to the holding fixture 6 by Pivoting the lever 20 (arrow L, FIG. 1).

A connection is therefore made between the quick-locking mechanisms 7 and 8 which project from the surface 9 of the holding fixture 6 and the quick-acting connections 15 and 16 which are made in the holding fixture 12.

By further action on the lever 20, a connection is made between the flat surface 9 of the holding fixture 6 and the flat surface 26 of the holding fixture 12.

It is advantageous to provide a locking device for the disk 19, the locking device being rendered inoperative when the quick-acting connections 7, 8, 15, 16 are fitted together.

The locking device consists, for example, of a pushbutton, with which it is possible to release a spring-loaded clamping pin which is arranged in the holding fixture 6.

The connecting operation between the fixtures 6 and 12, thanks to the selection of a suitable quick-locking mechanism, can be carried out with conduits under full pressure.

As soon as the holding fixtures 6 and 12 have been completely connected via the flat surfaces 9, 26, the pressurized hydraulic fluid (arrow f) in FIG. 1 is supplied.

The hydraulic fluid flows from the conduits 17 via the quick-acting connection 15 to the quick-acting connection 23 and to the line 2, which results in the actuation of the piston/cylinder unit which is provided for clamping the workpiece.

At the same time, the pressure reservoir 25 is filled via conduits (not shown) and the pressure gage 30 is influenced by the prevailing working pressure.

What is claimed is:

1. An arrangement for hydraulically clamping a workpiece to be processed on a pallet, comprising:
   a) a first holding fixture connected to the pallet, and including a first pair of hydraulic couplers for respectively delivering and discharging a hydraulic fluid to the pallet, and a holding pin;
   b) a second holding fixture movable relative to the first fixture to a holding position, and including a second pair of hydraulic couplers for respectively supplying and removing the hydraulic fluid to the first pair of couplers in the holding position; and
   c) an actuator mounted for turning movement about an axis on the second fixture, and including a disk having an eccentric, arcuate slot for receiving the holding pin, and a lever for moving the slot relative to the holding pin to hold the fixtures together in the holding position.

2. The arrangement of claim 1, wherein one of the fixtures has a pair of projections, and the other of the fixtures has a pair of bores for receiving the projections in the holding position.

3. The arrangement of claim 1, wherein each fixture has a generally planar surface in mutual surface area contact in the holding position.

4. The arrangement of claim 1, wherein the second fixture has a support for suspending the second fixture from overhead.

5. The arrangement of claim 1, and comprising a pressurized hydraulic fluid reservoir mounted on the first fixture and being in fluid flow communication with the first pair of couplers.

6. The arrangement of claim 1, and comprising a pressure gauge mounted on the first fixture and being in fluid flow communication with the first pair of couplers.

7. The arrangement of claim 1, and comprising a check valve mounted on the first fixture and being located intermediate the couplers of the first pair.

8. The arrangement of claim 1, wherein the slot has a closed end, and wherein the holding pin is lockingly received at the closed end in the holding position.

* * * * *